United States Patent
Williams

[15] 3,683,624
[45] Aug. 15, 1972

[54] INTERNAL COMBUSTION ENGINE EXHAUST BURNER

[72] Inventor: Theodore M. Williams, 847 Daytona Ave., Holly Hill, Fla. 32017

[22] Filed: Sept. 29, 1970

[21] Appl. No.: 76,486

[52] U.S. Cl. ............60/275, 23/277 C, 55/DIG. 30, 60/289, 60/297, 60/307, 60/316, 60/323
[51] Int. Cl. ...................F01n 3/14, F02b 75/10
[58] Field of Search ...60/29 A, 29 F, 30 R, 275, 297, 60/307, 289, 323, 316; 55/DIG. 30; 23/277 C

[56] References Cited

UNITED STATES PATENTS

| | | |
|---|---|---|
| 1,114,448 | 10/1914 | Chatain....................60/30 R |
| 2,378,083 | 6/1945 | Hull.........................60/30 R |
| 2,649,685 | 8/1953 | Cohen......................60/30 R |
| 2,795,103 | 6/1957 | Jenison....................60/30 R |
| 2,989,144 | 6/1961 | Styrie.......................60/30 R |
| 3,228,755 | 1/1966 | Lottinville................60/30 R |
| 3,386,241 | 6/1968 | Saufferer..................60/30 R |
| 3,526,081 | 9/1970 | Kusters....................60/30 R |

FOREIGN PATENTS OR APPLICATIONS

| | | |
|---|---|---|
| 411,807 | 9/1932 | Great Britain............60/30 R |
| 1,043,890 | 9/1966 | Great Britain............60/30 R |

*Primary Examiner*—Douglas Hart
*Attorney*—John N. Randolph

[57] ABSTRACT

An anti-pollution device for use with the exhaust system of a motor vehicle and which is preferably mounted in an air foil above the rear deck of an automobile for electrically collecting and burning particles constituting combustion residue from the vehicle engine. Air is supplied to the air foil to provide sufficient oxygen to effect the complete burning of the exhaust residue. The clean and purified exhaust gases, after passing through a filter media, are discharged from the air foil across substantially its entire length and at an upward angle.

9 Claims, 10 Drawing Figures

Patented Aug. 15, 1972
3,683,624
4 Sheets-Sheet 1
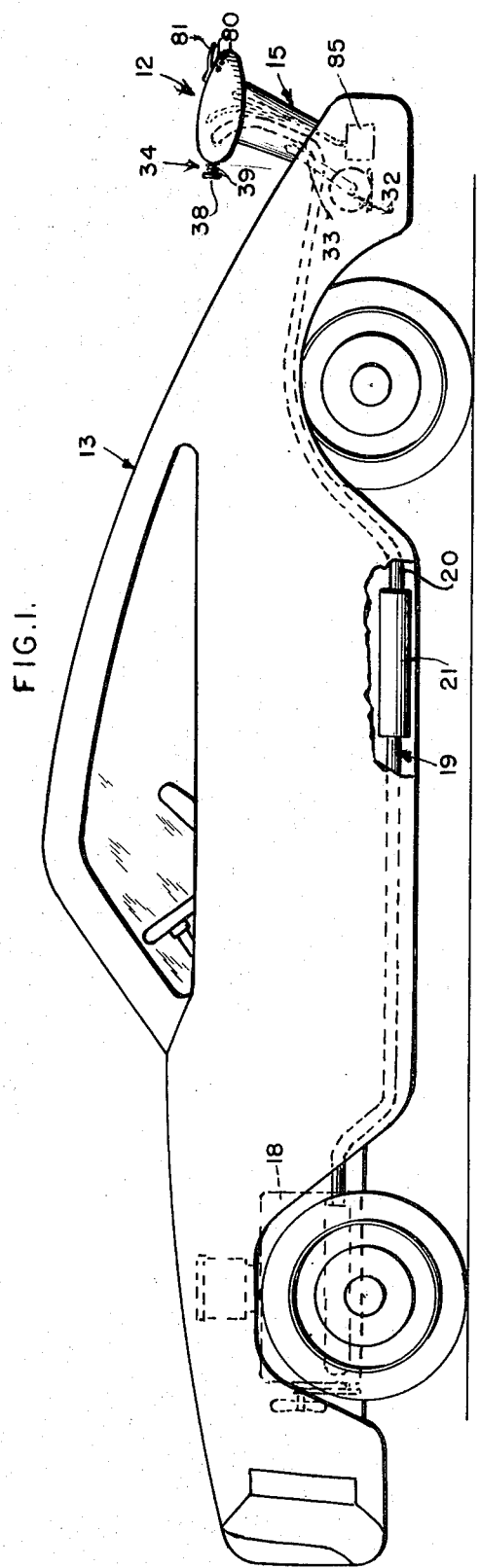
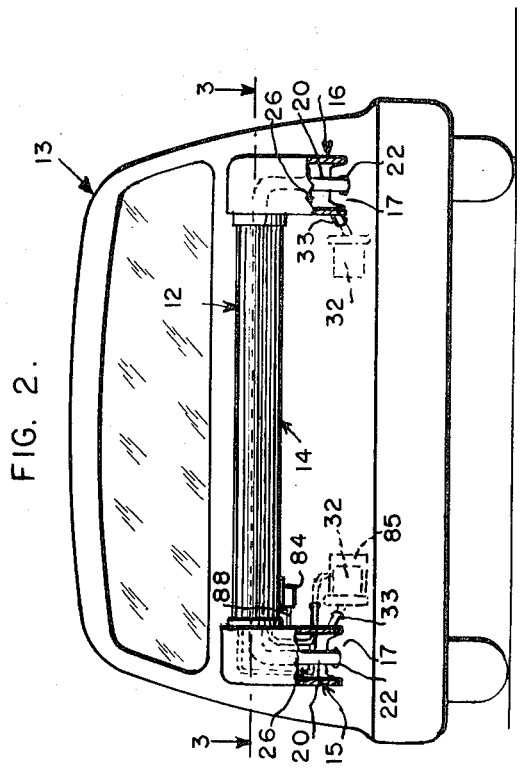
INVENTOR
THEODORE M. WILLIAMS
BY *John N. Randolph*
ATTORNEY Patented Aug. 15, 1972

INVENTOR
THEODORE M. WILLIAMS

BY John N. Randolph

ATTORNEY

INVENTOR
THEODORE M. WILLIAMS
BY John N. Randolph
ATTORNEY

Patented Aug. 15, 1972
3,683,624
4 Sheets-Sheet 4
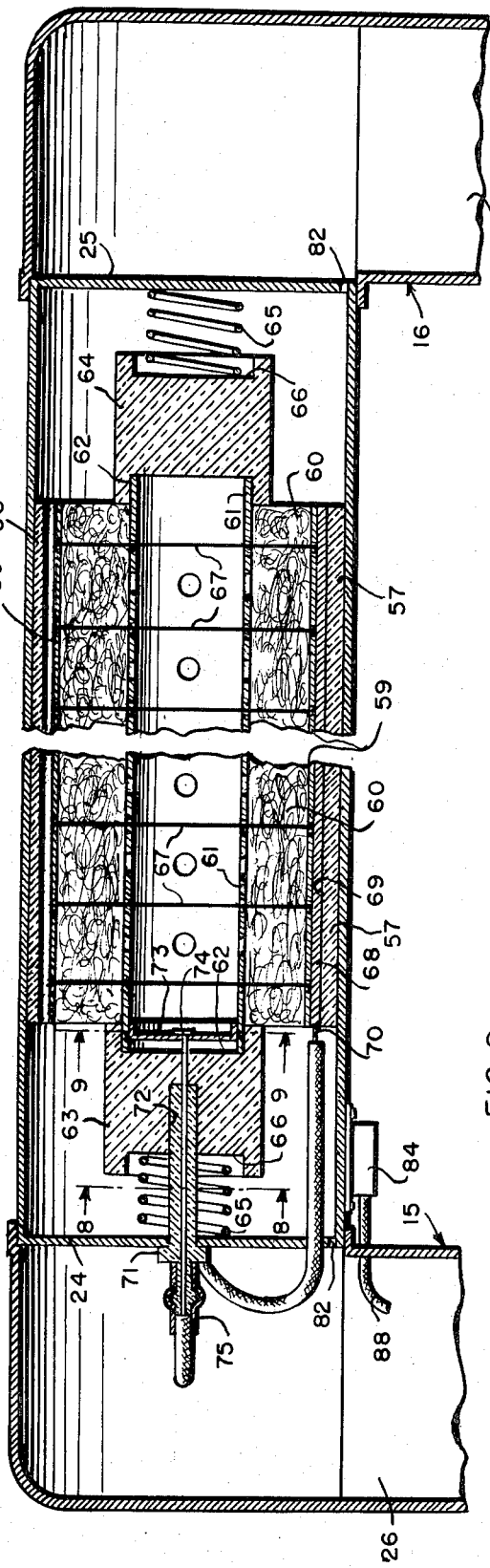
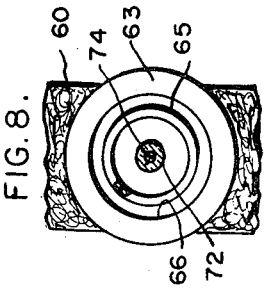
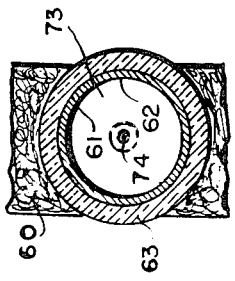
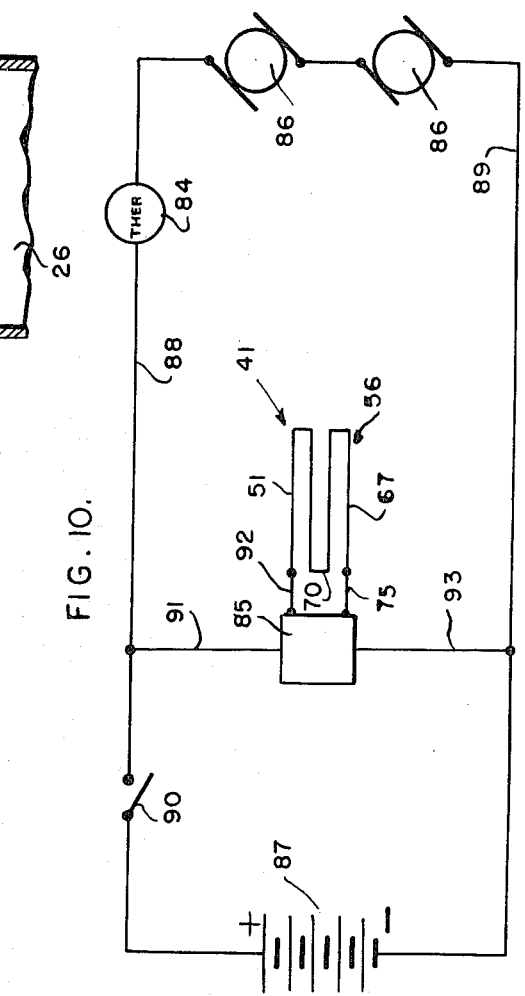
INVENTOR
THEODORE M. WILLIAMS
BY John N. Randolph
ATTORNEY 3,683,624

INTERNAL COMBUSTION ENGINE EXHAUST BURNER

SUMMARY

It is a primary object of the present invention to provide an attachment for an otherwise conventional motor vehicle exhaust system by means of which the exhaust gases are purified before being discharged to the atmosphere, and unconsumed particles of the combustion residue are burned and consumed before being discharged with the exhaust gases.

Another object of the invention is to provide a device from which the cleansed exhaust gases are consumed residue are discharged from above the rear deck of an automobile rather than against the roadway over which the vehicle is travelling.

A further object of the invention is to provide an exhaust burner wherein unconsumed particles of combustion residue are electrically collected while the vehicle engine is idling or the vehicle is moving at a low speed and thereafter burned and consumed when the vehicle is travelling at a high speed.

Still another object of the invention is to provide a device from which the cleansed exhaust gases will be discharged over a wide area disposed crosswise of the vehicle, at a substantial elevation and in an upward direction.

A further object of the invention is to provide a device wherein the purified exhaust gases will be extracted by a suction action from the unit, when the vehicle is travelling at high speeds, for improving the engine performance.

Various objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is a side elevational view, partly broken away, of an automobile equipped with the exhaust burner;

FIG. 2 is a rear elevational view thereof;

FIG. 7 is a view, similar to FIG. 6, taken substantially along a plane as indicated by the line 7—7 of FIG. 5, and with certain of the parts omitted;

FIGS. 8 and 9 are fragmentary cross sectional views, taken substantially along planes as indicated by the lines 8—8 and 9—9, respectively, of FIG. 7; and FIG. 10 is a diagrammatic view of the electric circuit of the exhaust burner.

DESCRIPTION OF THE PREFERRED EMBODIMENT

Figure 3:
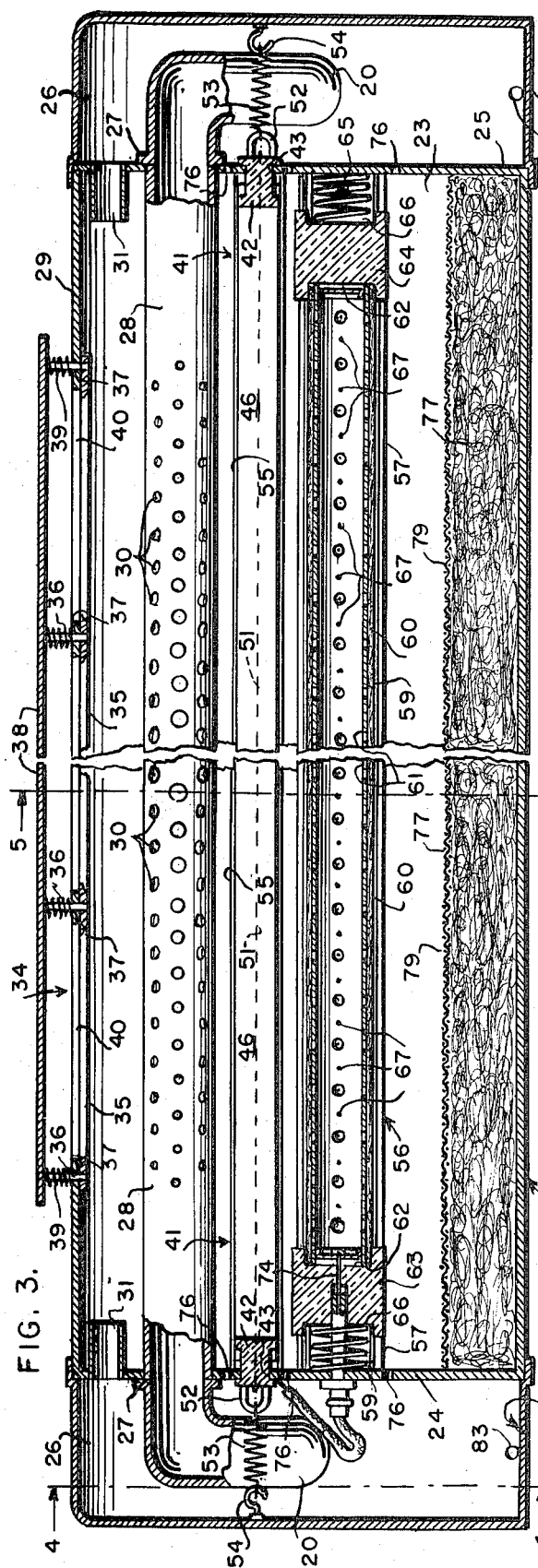
FIG. 3 is an enlarged, substantially horizontal sectional view, partly broken away, of the exhaust burner, taken substantially along a plane as indicated by the line 3—3 of FIG. 2.

Referring more specifically to the drawings, the exhaust burner in its entirety and comprising the invention is designated generally 12 and is shown mounted above the rear deck of an automobile 13, primarily housed in an air foil casing 14, which extends transversely across the rear portion of the vehicle 13 and which is supported in an elevated position relative thereto by stabilizer risers 15 and 16, FIG. 2, which are secured on and rise from portions 17 of the vehicle body and which likewise provide enclosures for portions of the unit 12. The internal combustion engine 18 of the vehicle 13 may be provided with a dual exhaust system 19, only one of which is fully shown. The exhaust systems 19 may be conventional except for the tailpipes 20 thereof, leading from the mufflers 21, and which extend upwardly through openings 22 of the vehicle body into the risers 15 and 16.

A chamber 23, as defined by the air foil casing 14, includes end walls 24 and 25 which separate said chamber from the hollow interiors 26 of the risers 15 and 16. The tailpipes 20 have flanged outlet ends 27 which are bolted to the outer sides of the walls 24 and 25 and which communicate with the ends of a tube or pipe 28 which extends from end-to-end of the casing 14 and which is located near the leading edge 29 of said casing. The pipe 28 has solid end portions and an intermediate portion which is provided with apertures 30 which increase in size toward the center of said pipe. Tubes 31 are mounted in the walls 24 and 25 and open therethrough and extend into the chamber 23, between the pipe 28 and said leading edge 29. Blowers 32 are mounted under the rear portion of the body of a vehicle 13, between the risers 15 and 16, and have outlet conduits 33 discharging into the chambers 26 of said risers for supplying air to the air foil chamber 23 through the riser chambers 26 and the tubes 31.

The leading edge 29 is provided with a valve 34 which extends throughout a substantial portion of the length thereof, as seen in FIG. 3. The valve 34 includes an elongated valve strip or bar 35 which is disposed within the chamber 23 and which has pins 36 at longitudinally spaced points projecting forwardly therefrom. The pins 36 extend slidably through openings 37 in the leading edge 29. An elongated bar or plate 38 is secured to the forward ends of the pins 36. Each pin 36 carries a compression spring 39 which is disposed between the leading edge 29 and the bar 28. As seen in FIG. 3, the leading edge 29 is provided with elongated slots 40 located between the openings 37. The springs 39 normally retain the valve 35 against the inner side of the leading edge 29 for closing the slots or ports 40, and the bar 38 is held spaced forwardly from said leading edge, for a purpose that will hereinafter be described.

Figure 6:
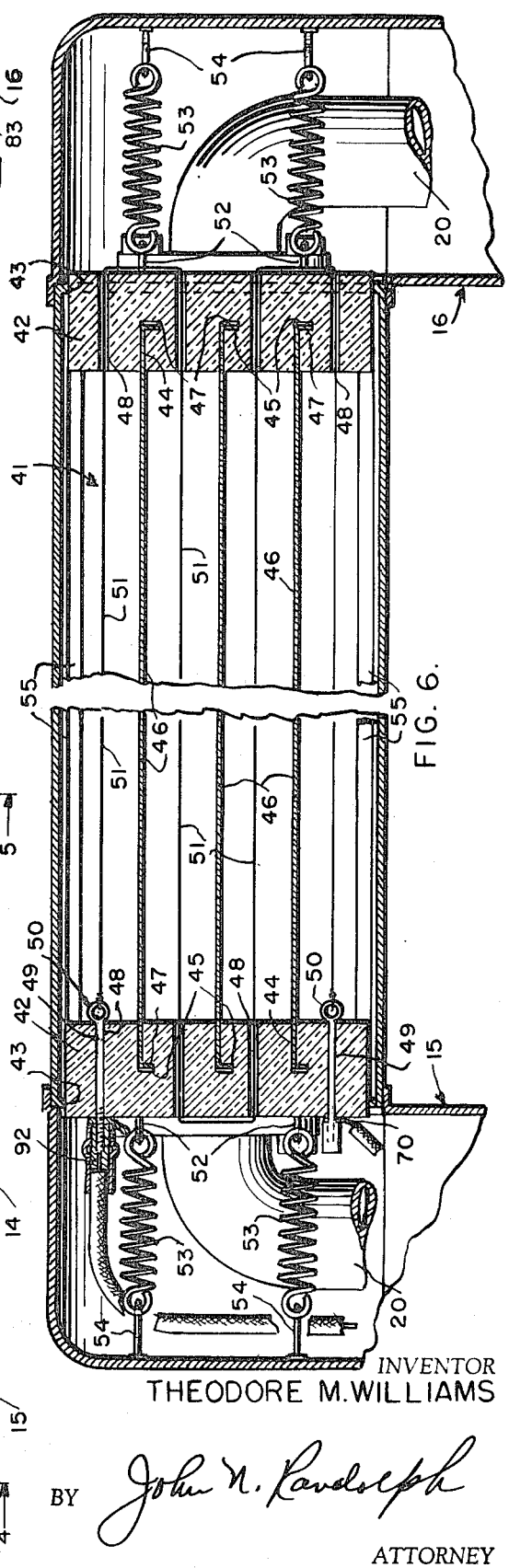
FIG. 6 is a fragmentary longitudinal sectional view, taken substantially along a plane as indicated by the line 6—6 of FIG. 5.

An electrical charging unit 41 extends from end-to-end and top to bottom of the chamber 23, behind and adjacent the pipe 28. As best seen in FIG. 6, the unit 41 includes electrical insulating blocks 42 which extend substantially from top to bottom of said chamber 23 and which are slidably mounted in openings 43 of the walls 24 and 25. The insulators 42 have vertically spaced slots 44 which open through their adjacent inner faces, which extend from side to side thereof, and which have downturned inner end portions 45. The slots 44 accommodate end portions of metal strips 46 which have downturned terminals 47 which fit in the downturned slot ends 45 for supporting the strips 46 between the insulators 42. It will be obvious that the metal strips 46 can be inserted transversely into the insulators 42.

Insulators 42 have bores 48 extending therethrough, from their inner to their outer sides, above and below the slots 44. Rods 49, constituting electrical contacts, are mounted in the uppermost and lowermost bores 48 of the insulator 42 which is disposed in the opening of the wall 24. Said rods 49 have eyes 50 at their inner ends to which are secured the ends of a conductor wire 51, preferably formed of tungsten. The wire 51 extends from the upper contact 49 through the upper bore 48 of the other insulator 42, back through the next bore 48 of said insulator, through intermediate bores 48 of the insulator 42 which carries the contacts 49, through the bottom two bores of the other insulator, and thence back to the eye 50 of the lower contact 49, so that the reaches of the wire 51 are disposed above and below the metal strips 46 which form shields.

Figure 5:
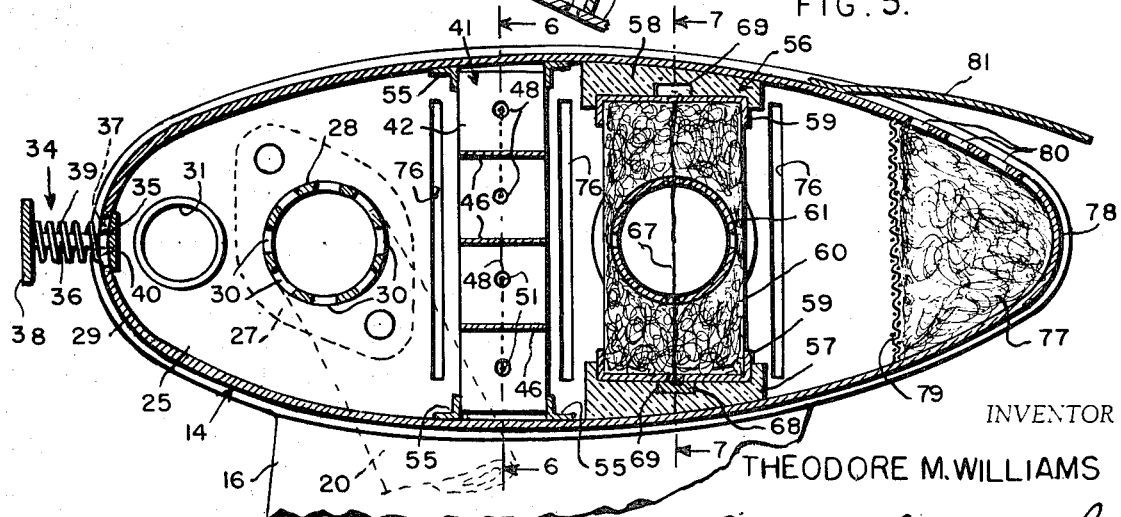
FIG. 5 is an enlarged fragmentary cross sectional view, taken substantially along a plane as indicated by the line 5—5 of FIG. 3.

Each insulator 42 has two outwardly projecting eyes 52 to each of which is connected the inner end of a pull spring 53. The outer ends of the springs 53 are connected to hooks 54 which are fastened to and extend inwardly from the outer walls of the risers 15 and 16. The springs 53 retain the strips 46 and the reaches of the wire 51 taut, irrespective of expansion or contraction of said parts as caused by heat, as will hereinafter become apparent. As seen in FIG. 5, angle members 55 are secured to the inner sides of the top and bottom portions of the casing 14 to provide channels for slidably receiving the upper and lower ends of the insulators 42.

Referring to FIGS. 5 and 7, the chamber 23 includes a collecting, burning and filtering unit 56 which is located behind the electrical charging unit 41, and which extends from end-to-end and from top to bottom of the casing 14. The unit 56 includes insulator members 57 and 58 which are secured to the inner sides of the top and bottom walls of the casing 14 and which define channels which open toward one another, as seen in FIG. 5. The channels of the insulators 57 and 58 each receive a channel-shaped metal strip 59. A mass 60 of a porous fire resistant filter media 60 is confined between the channel members 59. The filter media 60 preferably constitutes ceramic felt. A perforated metal tube 61 extends centrally through the filter media 60 and to beyond the ends thereof and has its ends seating in inwardly opening sockets 62 of two electrical insulating blocks 63 and 64. Compression springs 65 have adjacent ends seating in outwardly opening sockets 66 of the insulators 63 and 64 and have outer ends bearing against the walls 24 and 25. The springs 65 compensate for expansion of the parts of the unit 56 due to heat.

Electrical conductor wires 67 extend through the filter media 60 and electrically connect the channel members 59 to the tube 61. A conductor strip 68 extends through a groove 69 in the bottom insulator 57 and is in electrical engagement with the member 59 which engages said insulator. A conductor wire 70 extends from the bottom contact 49 to the conductor strip 68.

As seen in FIG. 7, a tubular insulator 71 extends through the wall 24, through the spring 65, which engages said wall, and into a central socket 72 of the insulator 63. A disc 73 fits into the end of the tube 61 which engages the insulator 63 to provide an electrical conductor between said tube 61 and a contact rod 74 which extends through the disc 73 and the insulators 63 and 71, and which connects with a conductor wire 75 which extends downwardly through the riser 15.

Figure 4:
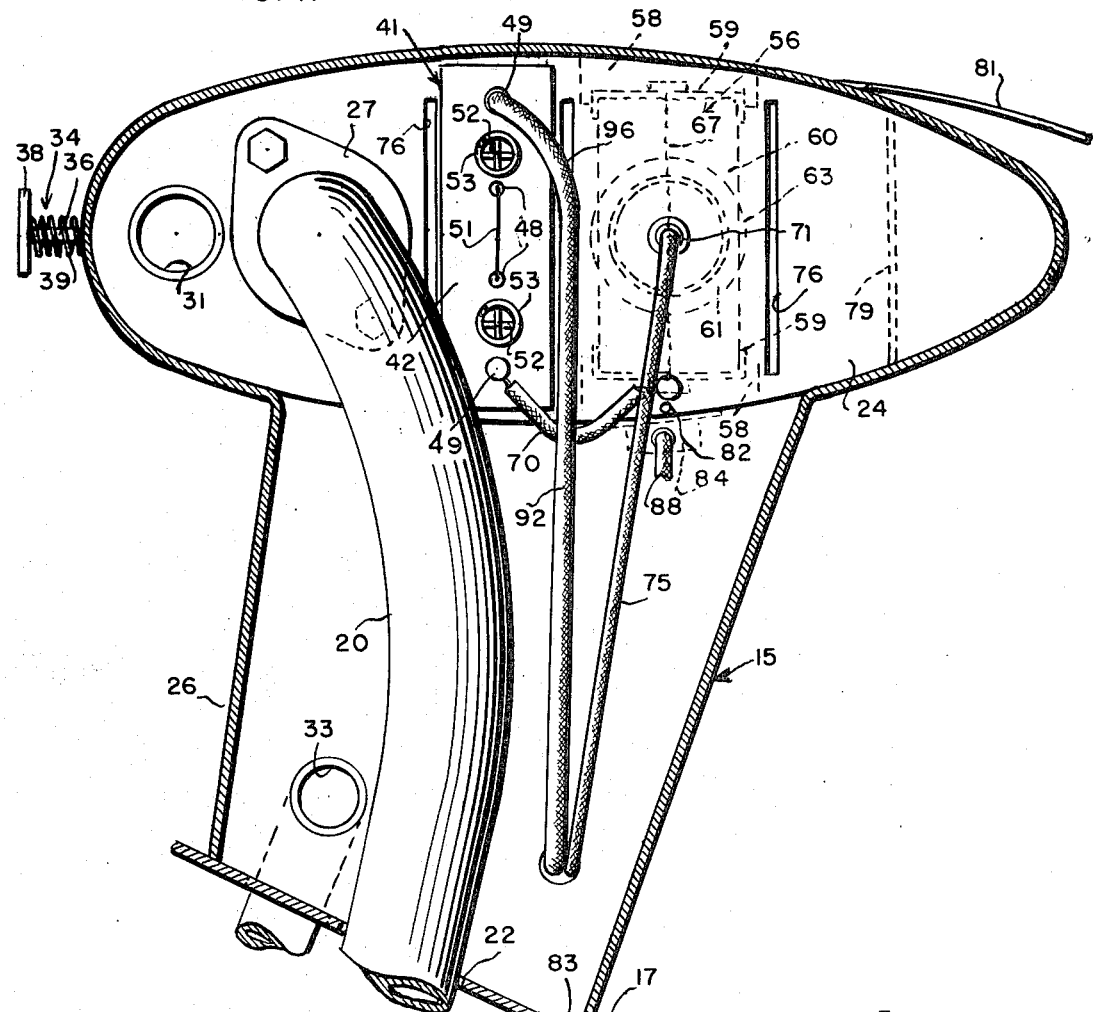
FIG. 4 is an enlarged vertical sectional view, partly broken away, taken substantially along a plane as indicated by the line 4—4 of FIG. 3.

As seen in FIGS. 3, 4 and 5, the walls 24 and 25 have slots 76 located in front of and behind the units 41 and 56, through which air can be supplied to the chamber 23 from the riser 15 and 16 for cooling the insulators 42, 63 and 64.

As seen in FIGS. 3 and 5, a porous mass of metal or ceramic strands 77 is confined in the trailing edge portion 78 of the casing 14 by a screen 79. The mass 77 and screen 79 extend from end-to-end of the casing 14, as seen in FIG. 3. As seen in FIG. 5, the upper side of said trailing edge 78 is provided with discharge ports 80 which are covered by a rain shield 81 having a leading edge secured to the exterior of the upper side of the casing 14 and which extends rearwardly therefrom and is disposed above and spaced from the ports 80.

As seen in FIGS. 4 and 7, the walls 24 and 25, adjacent their bottom edges, are provided with drainage ports 82 located in the area of the chamber 23 occupied by the unit 56 for draining off condensation from said chamber 23 into the riser chambers 26. As seen in FIGS. 3 and 4, the body portions 17 are provided with drainage ports 83 for draining off the moisture from said chambers 26.

The thermostat 84, as seen in FIGS. 2 and 4, is mounted on the underside of the casing 14. A conventional power pack 85, capable of converting 12 volt battery current to one of a higher voltage for operating the units 41 and 56, is supported under the body of the vehicle 13, as seen in FIGS. 1 and 2, sufficiently removed from the air foil 12 so as not to be affected by the heat therefrom.

FIG. 10 illustrates one form on an electric circuit which may be utilized for supplying current to the motors 86 of the blowers 32 and to the units 41 and 56. The electric circuit includes the storage battery 87 of the vehicle 13 from the positive terminal of which extends a conductor wire 88 to the motors 86. A conductor wire 89 extends back from the motors 86 to the negative terminal of the battery 87. The motors 86 are two-speed motors and the thermostat 84 is interposed in the wire 88 to function as a switch for stepping up the motors from their lower speed to their higher speed when the thermostat is heated to a predetermined extent. A manual switch 90, such as the vehicle ignition switch, is interposed in the conductor 88.

The switch 90 is located between the battery 87 and a conductor 91 which leads from the conductor 88 to the power pack 85. A conductor 92 connects the positive terminal of the power pack 85 to the upper contact member 49 and the conductor 75 connects with the negative terminal of the power pack 85. A negative conductor wire 93 connects the power pack 85 to the conductor 89.

From the foregoing, it will be apparent that when the ignition switch 90 is closed for starting the vehicle engine 18, that the blowers 32 will be placed in operation for supplying air to the forward part of the chamber 23 through the tubes 31; and the wires 51 and 67 will be energized. The exhaust gases from the engine 18 will enter the pipe 28 after passing through the tailpipes 20 and will be released into the chamber 23 through the apertures 30 to be conveyed rearwardly, with the air from the forward part of the chamber 23, through the charging unit 41 and the collecting and filtering unit 56. Arcing of the electric current between the reaches of the wire 51 and the metal shields 46 will charge any unconsumed particles of combustion passing through the unit 41. These charged particles will be initially collected in the filter media 60 of the electrically charged unit 56. The exhaust gases are filtered and cleansed in passing through the filter media 60 and thereafter pass through the screen 79 and the spark arrester mass 77 to the discharge ports 80 from which said gases are discharged into the atmosphere at an upward angle, over a wide area and at a substantial elevation.

As the speed of the vehicle increases, air pressure against the bars 35 and 38 will cause said bars to move rearwardly and compress the springs 39 for opening the air inlet ports 40, to supply additional air to the forward end of the chamber 23 to increase the rate of flow of the exhaust gases through and out of said chamber. In addition, as the casing 14 becomes heated, the thermostat 84 will close for stepping up the speed of the motors 86 from their lower to their higher speeds for increasing the rate of air flow to the chamber 23 through the tubes 31.

Exhaust particles passing through the unit 41 are ignited by sparks jumping between the reaches of the wire 51 and the shields 46. Said particles will in turn ignite the unconsumed particles previously collected by the filter 60 before the chamber was fully heated, for consuming the collected particles and thereby cleaning the filter media. Burning of the particles on the filter media can be enhanced by adding catalytic pellets to the filter media. It will thus be apparent that when the vehicle is travelling at a high speed, the exhaust particles will be burned and consumed, whereas said particles normally will only be collected when the engine is idling or the vehicle is travelling at a low speed and when the pollution problem is most severe. Additionally, the air passing over the rain shield 81, when the vehicle is travelling at a high speed, will create a suction force for drawing the exhaust gases from the outlet ports 80 and will thus increase the operating efficiency of the engine 18.

Various modifications and changes are contemplated and may be resorted to, without departing from the function or scope of the invention, as hereinafter defined by the appended claims.

I claim as my invention:

1. An internal combustion engine exhaust burner comprising a casing defining a chamber, conduit means connected to the exhaust system of an internal combustion engine of a motor vehicle and discharging into said casing, said casing having a forward portion and a rear portion, means supplying air to the forward portion of the casing in advance of the discharge of said conduit means into the casing for propelling the exhaust gases rearwardly through the casing, an electrical charging unit contained in said casing behind the discharge of said conduit means for electrically charging unconsumed particles of combustion passing therethrough, a collecting and filtering unit disposed in said casing behind said charging unit for cleansing the exhaust gases passing therethrough and for collecting the unconsumed charged combustion particles, and said rear portion having a plurality of outlet ports for discharging the cleansed exhaust gases to the atmosphere, said forward portion being rounded to provide a leading edge and said rear portion being rounded to provide a trailing edge thereof, said outlet ports opening at an upward angle from said trailing edge.

2. An internal combustion engine exhaust burner comprising a casing defining a chamber, conduit means connected to the exhaust system of an internal combustion engine of a motor vehicle and discharging into said casing, said casing having a forward portion and a rear portion, means supplying air to the forward portion of the casing in advance of the discharge of said conduit means into the casing for propelling the exhaust gases rearwardly through the casing, an electrical charging unit contained in said casing behind the discharge of said conduit means for electrically charging unconsumed particles of combustion passing therethrough, a collecting and filtering unit disposed in said casing behind said charging unit for cleansing the exhaust gases passing therethrough and for collecting the unconsumed particles, and said rear portion having a plurality of outlet ports for discharging the cleansed exhaust gases to the atmosphere, means electrically connecting said charging unit to the collecting and filtering unit for electrically attracting and holding the charged particles from the charging unit, said charging unit including an electrically energized conductor wire having a plurality of reaches spaced from one another, and metal plates, forming shields, interposed between said reaches and between which and the reaches of the conductor wire the unconsumed particles of combustion pass to be charged and ignited by arcing of the electric current.

3. An internal combustion engine exhaust burner comprising a casing defining a chamber, a conduit means connected to the exhaust system of an internal combustion engine of a motor vehicle and discharging into said casing, said casing having a forward portion and a rear portion, means supplying air to the forward portion of the casing in advance of the discharge of said conduit means into the casing for propelling the exhaust gases rearwardly through the casing, an electrical charging unit contained in said casing behind the discharge of said conduit means for electrically charging unconsumed particles of combustion passing therethrough, a collecting and filtering unit disposed in said casing behind said charging unit for cleansing the exhaust gases passing therethrough and for collecting the unconsumed charged combustion particles, and said rear portion having a plurality of outlet ports for discharging the cleansed gases to the atmosphere, said conduit means connected to the exhaust system including a pipe extending from end-to-end of the casing and connected at both of its ends to the vehicle exhaust system, said pipe having an intermediate portion provided with outlet apertures, said apertures increasing in size toward the central portion of the pipe.

4. An exhaust burner as in claim 2, said rear portion of the casing containing a porous mass of a non-inflammable material through which the cleansed exhaust gases, including the consumed particles of combustion, pass to said outlet ports.

5. An exhaust burner as in claim 1, said means for supplying air to the casing including blower means disposed remote from the casing, conduit means leading from the blower means and discharging into the ends of the casing, and means responsive to the temperature of the casing for regulating the rate of air flow from the blower means to the casing.

6. An exhaust burner as in claim 1, said means for supplying air to the casing comprising air inlet ports in said leading edge, and valve means for closing said air inlet ports, said valve means being opened in response to air pressure at the exterior of the leading edge.

7. An exhaust burner as in claim 1, and a rain shield secured to an upper side of the casing and extending rearwardly therefrom and disposed over said discharge ports, said shield combining with the upper surface of the casing to create a suction at the discharge ports when the vehicle is moving in a forward direction.

8. An exhaust burner as in claim 2, said charging unit additionally including electrical insulator blocks slidably mounted in the casing and between which the reaches of the conductor wire and the metal shields extend, and spring means urging said insulator blocks away from one another to compensate for expansion of the wire reaches and the metal shields due to heat and for retaining the wire reaches and shields taut.

9. An exhaust burner as in claim 1, said collecting and filtering unit including a mass of a filter media, a perforated metal tube extending centrally through the filter media, insulator blocks engaging the ends of said tube for supporting the tube, and spring means yieldably urging said insulator blocks toward one another to compensate for expansion of the collecting and filtering unit due to heat.

* * * * *